United States Patent Office 3,323,930
Patented June 6, 1967

3,323,930
ULTRAVIOLET LIGHT STABILIZED
PLASTIC COMPOSITION
Gordon C. Newland and Ronald H. Meen, Kingsport, Tenn., assignors to Eastman Kodak Company, Rochester, N.Y., a corporation of New Jersey
No Drawing. Filed Nov. 28, 1962, Ser. No. 240,749
36 Claims. (Cl. 106—176)

This invention relates to organic plastic materials. More particularly, it relates to the problem of protecting them from the adverse effect of ultraviolet light.

It is well known that ultraviolet light tends to cause nearly all organic plastic materials to degrade. This effect is particularly pronounced in the case of those plastic materials which are frequently exposed to sunlight. In such case, the effect is termed weathering.

This invention is based upon the discovery that 1-hydroxyxanthen-9-one and 1-hydroxythioxanthen-9-one compounds are highly effective inhibitors of ultraviolet light degradation of organic plastic materials.

In summary, this invention comprises a plastic composition consisting essentially of an organic plastic material and at an ultraviolet light protective concentration an additive of the group consisting of 1-hydroxyxanthen-9-one and 1-hydroxythioxanthen-9-one compounds.

The organic plastic material comprises at least one resin normally degraded by ultraviolet light. Representative of such a resin are the normally solid polymers of $\alpha$-monolefins having 2–4 carbon atoms, cellulose esters of organic acids having 2–4 carbon atoms, polyesters (normally solid polymers of polyhydric alcohols and polycarboxylic acids), poly(vinyl chloride) resins and the like. Examples of polymers of $\alpha$-monoolefins having 2–10 carbon atoms are the normally solid polymers and copolymers of ethylene, propylene, butene-1 and the like. Examples of cellulose organic esters of organic acids having 2–4 carbon atoms are cellulose acetate, cellulose propionate, cellulose butyrate, cellulose acetate-butyrate and cellulose acetate-propionate. The organic plastic material can also comprise a blend or mixture of resins normally degraded by ultraviolet light.

The 1-hydroxyxanthen-9-one and 1-hydroxythioxanthen-9-one compounds of this invention are a class of compounds of the general formula:

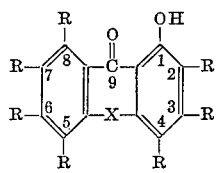

wherein X is selected from the group of oxygen and sulfur radicals and each R is independently selected from the group consitsing of hydrogen, hydroxyl, halide, $C_1$–$C_{18}$ alkyl and $C_1$–$C_{18}$ alkoxy radicals. As a class these compounds can be readily made. Typical examples of these compounds and references disclosing their preparation are:

| Compound | Reference |
|---|---|
| 1-hydroxy-4-methoxythioxanthen-9-one. | Roberts et al., J. Chem. Soc., 1325 (1929). |
| 1-hydroxyxanthen-9-one. | Pankajamini et al., J. Sci. & Ind. Res. (India) 13B, 396–400 (1954). |
| 1,3-dihydroxyxanthen-9-one. | R. C. Shale et al., J. Chem. Soc., 3982 (1955). |

Other examples of these compounds are:

1-hydroxy-3-dodecyloxyxanthen-9-one
1-hydroxy-3-chloroxanthen-9-one
1-hydroxy-3-octadecyloxyxanthen-9-one
1-hydroxy-6-chloroxanthen-9-one
1,8-dihydroxy-3,6-didodecyloxyxanthen-9-one
1,8-dihydroxy-3,6-didodecyloxythioxanthen-9-one
1,8-dihydroxy-3,6-dichlorothioxanthen-9-one
1,3-dihydroxyxanthen-9-one
1,3-dihydroxythioxanthen-9-one
1-hydroxy-3-methoxyxanthen-9-one
1,3,6,8-tetrahydroxyxanthen-9-one
1,3,6,8-tetrahydroxythioxanthen-9-one
1-hydroxy-3-octylxanthen-9-one
1-hydroxy-3-octylthioxanthen-9-one
1,8-dihydroxy-3,6-dimethoxyxanthen-9-one
1-hydroxy-4-tert-butylthioxanthen-9-one
1-hydroxy-4-(1-methylheptadecyl)thioxanthen-9-one
1-hydroxy-4-dodecyloxythioxanthen-9-one
1,3-dihydroxy-6-octylxanthen-9-one
1-hydroxy-3-nonylxanthen-9-one
1-hydroxy-4-nonylthioxanthen-9-one
1-hydroxy-3-tert-amylxanthen-9-one
1,8-dihydroxy-3,5-ditert-butylxanthen-9-one
1,8-dihydroxy-2,4,6-7-tetrachloroxanthen-9-one
1-hydroxy-2,7-dimethylxanthen-9-one
1,8-dihydroxy-4,6-dimethylthioxanthen-9-one
1,8-dihydroxy-5,6-dimethylxanthen-9-one
1-hydroxy-3-nonyloxyxanthen-9-one
1,8-dihydroxy-3,6-dinonyloxyxanthen-9-one
1,8-dihydroxy-3,6-dimethoxythioxanthen-9-one Under the concepts of this invention, these compounds are useful as ultraviolet light stabilizers or inhibitors in organic plastic compositions.

The concentration of the ultraviolet light stabilizer in the plastic composition of this invention depends in general upon the end use of the particular plastic composition into which the stabilizer is incorporated. However, for most purposes, a concentration generally in a range from about 0.1 to about 10% by weight of the plastic material gives satisfactory results.

The ultraviolet light stabilizer of this invention is incorporated into the plastic material to be stabilized by any suitable procedure for incorporating additives into the particular plastic material. Generally, such incorporation can be performed by any one of a number of well known, conventional methods such as roll compounding, extrusion, solvent mixing, dry blending, etc. For example, such incorporation can be performed by heating or otherwise softening the plastic material to a workable consistency and then working in the ultraviolet light stabilizer until a substantially uniform mixture or dispersion is obtained.

In addition to the organic plastic material and the ultraviolet light stabilizer, specific embodiments of the plastic composition of this invention can also comprise other components such as, for example, antioxidants, colorants (pigments and dyes), plasticizers, extenders, fillers, foaming or blowing agents, property improvers, reinforcing materials and the like. Such components are incorporated into the plastic composition whenever desired and generally by conventional ways and means.

The plastic composition of this invention is usually cast or molded into any desired shape, for example, pellets, plates, sheeting, film, fibers, filaments, bars, specially shaped articles and the like, as by conventional casting and molding techniques which include extrusion, blow molding, and the like.

This invention is further illustrated by the following examples of various aspects thereof, including specific embodiments of the invention. Unless otherwise indicated, this invention is not limited to these specific embodiments.

EXAMPLE 1

This example illustrates the preparation of 1-hydroxy-3-dodecycloxyxanthen-9-one.

9.08 grams (0.04 mole) of 1,3-dihydroxyxanthen-9-one [prepared according to the procedure of R. C. Shale et al., J. Chem. Soc., 3982 (1955)], 10.0 grams (0.04 mole) of n-dodecylbromide, 25 grams of anhydrous potassium carbonate and 1,000 milliliters of acetone are admixed and stirred under reflux for 44 hours. The resulting reaction mixture is filtered while still hot in order to remove suspended inorganic salts. The filtrate is concentrated to about 100 milliliters by distilling therefrom part of the acetone. Thereafter, the concentrated filtrate is cooled to about 20° C. This results in the formation of pale yellow, platelet shaped crystals. A typical quantity is 6.94 grams, representing a yield of 44%. Melting point of the crystals is typically 97–99° C. The analysis calculated for $C_{25}H_{32}O_4$, which corresponds to 1-hydroxy-3-dodecyloxyxanthen-9-one, is: C=75.77%, H=8.14%. A typical analysis actually found is: C=75.83%, H=8.20%.

EXAMPLES 2–3

These examples illustrate specific embodiments of a cellulose acetate-butyrate composition of this invention. The formulations of these two embodiments are—

*Example 2 formulation*

| Components: | Concentration in parts by wt. |
|---|---|
| Cellulose acetate-butyrate | 100 |
| Dibutyl sebacate | 12 |
| 1,3-dihydroxyxanthen-9-one | 1 |

*Example 3 formulation*

| Components: | Concentration in parts by wt. |
|---|---|
| Cellulose acetate-butyrate | 100 |
| Dibutyl sebacate | 12 |
| 1-hydroxy-3-n-dodecyloxyxanthen-9-one | 1 |

In these two formulations the dibutyl sebacate is present as a plasticizer.

The cellulose acetate-butyrate compositions of these formulations are made by the usual hot roll compounding procedure.

The resulting compositions are useful as materials of construction for plates, sheets, films and the like, which can be made therefrom by compression molding.

Samples of these two formulations as well as samples of other cellulose acetate-butyrate formulations involving 100 parts by weight of cellulose acetate-butyrate, 12 parts by weight of dibutyl sebacate and, where indicated in the following Table I, 1 part by weight of the indicated additive, were actually tested for resistance to ultraviolet light. The cellulose acetate-butyrate used in these samples was a conventional, commercially available material. In each case the samples were prepared according to the foregoing procedure followed by compression molding of flat plates 50 mils thick. These plates were cut into test specimens 0.5 inch by 2.5 inches. The test specimens were exposed in a modified Atlas Twin-Arc Weather-Ometer [Anal. Chem. 25, 460 (1953)]. The progress of weathering damage of each test specimen was quantitatively followed by measurements of flexural strength and brittleness. Flexural strength was measured by the Tour-Marshall test for stiffness in flexure (ASTM D747–43). Brittleness was considered to have developed in each specimen when a break occurred therein at a bend angle of less than 90° in the Tour-Marshall test. The test results are summarized in the following Table I.

TABLE I

| Sample No. | Additive | Hours of Exposure in Weather-Ometer for— | |
|---|---|---|---|
| | | 25% Loss in Flexural Strength | Embrittlement |
| 1 | None | 150 | 235 |
| 2 | Phenyl salicylate | 1,700 | 3,000 |
| 3 | 2-Hydroxybenzophenone | 1,000 | 2,700 |
| 4 | 1,3-Dihydroxyxanthen-9-one | >8,000 | >8,000 |
| 5 | 1-Hydroxy-3-n-dodecyloxyxanthen-9-one | >8,000 | >8,000 |

It will be observed that samples 4 and 5 correspond to the cellulose acetate-butyrate formulations of Examples 2 and 3, respectively. Comparison of the test data for these two samples with that of sample 1 reveals than the 1-hydroxyxanthen-9-one compounds are efficient ultraviolet light stabilizers for cellulose acetate-butyrate. Moreover, it will be observed from a comparison of the test data for samples 4 and 5 with the test data for samples 2 and 3 that the 1-hydroxyxanthen-9-one compounds in cellulose acetate-butyrate have stabilizing efficiencies approximately four times that of phenyl salicyclate and eight times that of 2-hydroxybenzophenone in cellulose acetate-butyrate.

EXAMPLES 3–4

These examples illustrate specific embodiments of a polyethylene composition of this invention.

The formulations of these two polyethylene compositions are—

*Example 4 formulation*

| Components: | Concentration in parts by wt. |
|---|---|
| Normally solid polyethylene | 100 |
| 1-hydroxyxanthen-9-one | 1 |

*Example 5 formulation*

| Components: | Concentration in parts by wt. |
|---|---|
| Normally solid polyethylene | 100 |
| 1-hydroxy-3-n-dodecyloxyxanthen-9-one | 1 |

The polyethylene compositions of these two specific formulations are made by hot roll milling of the components in the usual manner. The roll slab thus obtained can be compression molded into plates, sheets, films and the like.

Test samples of these specific polyethylene compositions and of polyethylene compositions prepared from polyethylene and the additives indicated in the following Table II, were subjected to actual weathering tests. The polyethylene employed in making up these test samples was a conventional, commercially available, low density polyethylene of melt index 2. Each poyethylene composition was prepared in accordance with the foregoing procedure and the resulting roll slab of each sample was compression molded into a 125 mil thick plate. Four test specimens 0.5 inch by 1.5 inches were cut from each 125 mil thick plate, bent into a U and while so bent inserted into a channel 0.5 inch wide. The test specimens while so mounted under stress in the channels were exposed outdoors at Kingsport, Tennessee, at an angle 36.5° from the horizontal. Each test specimen was periodically observed for the development of cracks which were visible to the unaided eye. The period of time for such cracks to appear was thus determined for each test specimen. From these data, the stress crack life of each sample was determined, the stress crack life being the average exposure time results are summarized in the following Table II.

TABLE II

| Sample No. | Additive | Outdoors Stress Crack Life in Months |
| --- | --- | --- |
| 1 | None | 12 |
| 2 | 2-Hydroxybenzophenone | 14 |
| 3 | 2-Hydroxy-4-dodecyloxybenzophenone | >84 |
| 4 | 1-Hydroxyxanthen-9-one | 27 |
| 5 | 1-Hydroxy-3-n-dodecyloxyxanthen-9-one | >30 |

The values indicated in Table II as being "greater than" are the exposure times at the time of reporting. All indications are that the total outdoor exposure time required to develop cracks in the test specimens of the corresponding samples may require several more years.

Samples 3 and 4 in Table II, it will be observed, correspond to the formulations of Examples 4 and 5. Comparison of the test data for samples 4 and 5 with that of sample 1 shows that the 1-hydroxyxanthen-9-one compounds are effective ultraviolet light stablizers for polyethylene.

Comparison of the outdoors stress crack life of the test sample containing 1-hydroxyxanthen-9-one with the test sample containing 2-hydroxybenzophenone indicates that the 1-hydroxyxanthen-9-one compound is at least 7 times as effective an ultraviolet light stabilizer for polyethylene than the 2-hydroxybenzophenone.

EXAMPLES 6–9

These examples illustrated specific embodiments of a polypropylene composition of this invention.

The formulations of these specific embodiments are—

*Example 6 formulation*

Components: Concentration in parts by wt.
Normally solid polypropylene _____ 100
1-hydroxyxanthen-9-one _____ 5

*Example 7 formulation*

Components:
Normally solid polypropylene _____ 100
1,3-dihydroxyxanthen-9-one _____ 5

*Example 8 formulation*

Components:
Normally solid polypropylene _____ 100
3-dodecyloxy-1-hydroxyxanthen-9-one _____ 5

*Example 9 formulation*

Components:
Normally solid polypropylene _____ 100
1-hydroxy-4-methoxythioxanthen-9-one _____ 5

The specific compositions of these formulations are prepared in each case by forming a 4% by weight dope of the polypropylene in 1,2,3,4-tetrahydronaphthalene, adding the additive to the dope and mixing by stirring for 30 minutes at 145° C. The resulting dope is then cast into a film and the 1,2,3,4-tetrahydronaphthalene evaporated therefrom.

Samples of the foregoing formulations were actually subjected to stability testing along with samples of other polypropylene compositions. Each sample was prepared in accordance with the foregoing procedure from a conventional, commercially available, crystalline polypropylene characterized by an inherent viscosity of 1.84 and with the additive indicated for that sample in the following Table III. In each case the polypropylene component of the sample amounted to 100 parts by weight and the additive concentration amounted to 5 parts by weight. In the case of each sample, the dope obtained in accordance with the procedure was cast onto a ferrotype plate at a temperature of 143° C., and the 1,2,3,4-tetrahydronaphthalene was evaporated therefrom to leave a 3 mil thick film. The film in each case was quenched in cold water and then peeled from the ferrotype plate. Test specimens 0.5 inch by 2.5 inches were cut from the films of the test samples, and exposed in a modified Atlas Twin-Arc Weather-Ometer [Anal. Chem. 25, 460 (1953)]. Each test specimen was periodically observed for the development of brittleness. A test specimen was determined to have developed brittleness when it cracked when creased with the exposed side of the film on the outside of the crease. The time in which brittleness developed was then determined. On the basis of the time data, a stabilization rating for each test sample was calculated. This rating is the ratio of exposure time required for development of brittleness in the polypropylene with additive to the exposure time for development of brittleness in polypropylene without additive. The test results are summarized in the following Table III.

TABLE III

| Sample No. | Additive | Stabilization Rating |
| --- | --- | --- |
| 1 | None | 1.0 |
| 2 | 2-Hydroxybenzophenone | 1.0 |
| 3 | 2-Hydroxy-4-methoxybenzophenone | 2.0 |
| 4 | 2-Hydroxy-4-decyloxybenzophenone | 14.0 |
| 5 | 1-Hydroxyxanthen-9-one | 2.0 |
| 6 | 1,3-Dihydroxyxanthen-9-one | 3.0 |
| 7 | 3-Dodecyloxy-1-hydroxyxanthen-9-one | 19.0 |
| 8 | 1-Hydroxy-4-methoxythioxanthen-9-one | 10.0 |

Samples 5–8, it will be observed, correspond to the formulations of Examples 6–9, respectively. Comparison of the stabilization ratings for samples 5–8 with the stabilization rating for sample 1 reveals that the 1-hydroxyxanthen-9-one and 1-hydroxythioxanthen-9-one compounds are effective ultraviolet light stabilizers for normally solid polypropylene. Further comparison of the stabilization ratings show that 2-hydroxybenzophenone is ineffective as an ultraviolet light stabilizer for polypropylene while derivatives of 2-hydroxybenzophenone are effective stabilizers for polypropylene. On the other hand, comparison of the stabilization ratings show that 1-hydroxyxanthen-9-one is an effective ultraviolet light stabilizer for polypropylene while derivatives of 1-hydroxyxanthen-9-one are substantially more effective ultraviolet light stabilizers than the corresponding derivatives of 2-hydroxybenzophenone.

EXAMPLES 10–12

These examples illustrate some more specific embodiments of a polypropylene composition of this invention.

The formulations of these specific embodiments are—

*Example 10 formulation*

Components: Concentration in parts by wt.
Normally solid polypropylene _____ 100
1-hydroxyxanthen-9-one _____ 1

*Example 11 formulation*

Components:
Normally solid polypropylene _____ 100
1-hydroxy-3-dodecyloxyxanthen-9-one _____ 1

*Example 12 formulation*

Components:
Normally solid polypropylene _____ 100
1-hydroxy-4-methoxythioxanthen-9-one _____ 1

The specific compositions of the foregoing formulations are made by mixing the components in an inert atmosphere by blending in a C. W. Brabender plastograph. The resulting mix in each case is granulated. The granules thus obtained are useful as materials of construction for articles of substantial thickness such as bars and the like, which can be made therefrom as by injection molding.

Test samples of these polypropylene compositions and other polypropylene compositions consisting of the polypropylene component and the additives indicated in the following Table IV, were tested for ultraviolet light stability. In each case, the polypropylene employed was a conventional, commercially available crystalline polypropylene of inherent viscosity 1.84. The compositions were prepared in each case in accordance with the foregoing procedure. The granules thus obtained were injection molded into tensile bars 1/16 inch thick and 2.5 inches long. Three tensile bar specimens of each test sample were bent into a U and while so bent were inserted into a 5/8 inch wide channel and the channel then placed into a modified Atlas Twin-Arc Weather-Ometer of the kind hereinbefore referred to. The tensile bar specimens were then periodically observed for the development of cracks. Cracks were determined to have developed when such became visible under 3× magnification. The time taken for each sample to develop cracks was determined and from such data the stress crack life for each test sample was calculated. The stress crack life in these tests is defined as the average exposure time required to develop cracks in all three tensile bar specimens of the sample. The test results are summarized in the following Table IV.

TABLE IV

| Sample No. | Additive | Stress Crack Life in Hours |
|---|---|---|
| 1 | None | 90 |
| 2 | 2-Hydroxybenzophenone | 100 |
| 3 | 2-Hydroxy-4-methoxybenzophenone | 420 |
| 4 | 2,2'-Dihydroxybenzophenone | 330 |
| 5 | 1-Hydroxyxanthen-9-one | 210 |
| 6 | 1-Hydroxy-3-dodecyloxyxanthen-9-one | 510 |
| 7 | 1-Hydroxy-4-methoxythioxanthen-9-one | >950 |

Samples 5–7 correspond to the formulations of Examples 10–12. Comparison of the stress crack life data for samples 5–7 with the stress crack life of sample 1 show that the 1-hydroxyxanthen-9-one and 1-hydroxythioxanthen-9-one compounds are effective ultraviolet light stabilizers for polypropylene. Moreover, comparison of the stress crack lives of sample 5 and sample 2, of sample 6 and sample 3 and of sample 7 and sample 4 show that the 1-hydroxyxanthen-9-one and 1-hydroxythioxanthen-9-one compounds are substantially more effective ultraviolet light stabilizers than the corresponding 2-hydroxybenzophenone compounds.

EXAMPLES 13–15

These examples illustrate specific embodiments of a polyester composition of this invention.

The formulations of these specific embodiments are as follows.

*Example 13 formulation*

Components:  Concentration in parts by wt.
Powdered polyester from terephthalic acid and 1,4-cyclohexanedimethanol at a 1:1 mole ratio _____ 100
1,3-dihydroxyxanthen-9-one _____ 1

*Example 14 formulation*

Components:
Powdered polyester of terephthalic acid and 1,4-cyclohexanedimethanol, 1:1 mole ratio _____ 100
1-hydroxy-3-n-dodecyloxyxanthen-9-one _____ 1

*Example 15 formulation*

Components:
Powdered polyester of terephthalic acid and 1,4-cyclohexanedimethanol at a 1:1 mole ratio __ 100
1-hydroxy-4-methoxythioxanthen-9-one _____ 1

The compositions of the foregoing formulations are prepared by dry blending the powdered polyester and the 1-hydroxyxanthen-9-one and 1-hydroxythioxanthen-9-one compounds. In each case the resultant blend or mix can be extruded into, for example, films.

Test samples of the specific compositions and of the powdered polyester alone were prepared in accordance with the foregoing procedure. The blend in each case was extruded into a film 10 mils thick. Test specimens 0.5 inch by 2.5 inches were cut from the extruded film in each case, placed in a modified Atlas Twin-Arc Weather-Ometer of the kind hereinbefore described and the test specimens periodically observed for the development of brittleness. Brittleness in this instance was determined to have developed in a test specimen when the film cracked when creased with the exposed side on the outside of the crease. The test results are summarized in the following Table V.

TABLE V

| Sample No. | Additive | Exposure Time in Hours Required for Embrittlement |
|---|---|---|
| 1 | None | 5,000 |
| 2 | 1,3-Dihydroxyxanthen-9-one | >6,800 |
| 3 | 1-Hydroxy-3-n-dodecyloxyxanthen-9-one | >6,800 |
| 4 | 1-Hydroxy-4-methoxythioxanthen-9-one | >6,800 |

Samples 2–4 correspond to the formulations of Examples 13–15, respectively. Comparison of the test data of samples 2–4 with the test data of sample 1 show that the 1-hydroxyxanthen-9-one and 1-hydroxythioxanthen-9-one compounds are effective ultraviolet light stabilizers for polyesters. The "greater than" signs before the embrittlement data indicates that at the time the data were reported, the testing was still in progress and that the full extent of stabilization had at the time of reporting not yet been ascertained.

EXAMPLES 16–18

These examples illustrate some more specific embodiments of a polyester composition of this invention.

The formulations of the specific embodiments are—

*Example 16 formulation*

Components:  Concentration in parts by wt.
Powdered polyester of terephthalic acid, isophthalic acid and 1,4 - cyclohexanedimethanol at a 0.83:0.17:1 mole ratio _____ 100
1,3-dihydroxyxanthen-9-one _____ 1

*Example 17 formulation*

Components:
Powdered polyester of terephthalic acid, isophthalic acid and 1,4 - cyclohexanedimethanol at a 0.83:0.71:1 mole ratio _____ 100
1-hydroxy-3-n-dodecyloxyxanthen-9-one _____ 1

*Example 18 formulation*

Components:
Powdered polyester of terephthalic acid, isophthalic acid and 1,4 - cyclohexanedimethanol at a 0.83:0.71:1 mole ratio _____ 100
1-hydroxy-4-methoxythioxanthen-9-one _____ 1

The compositions of the foregoing formulations are prepared by dry blending the components. The resulting blend in each case can be extruded into film.

Test samples of the foregoing compositions and a test sample of the polyester without any additives were prepared in accordance with the foregoing procedure and were extruded as 10 mil thick films. Test specimens 0.5 inch by 2.5 inches were cut from the films and exposed in a modified Atlas Twin-Arc Weather-Ometer of the type hereinbefore described. The test specimens were observed for the development of brittleness which was determined to be present when the film specimen in each case cracked with the exposed side on the outside of the crease. The exposure time required for the development of brittleness was thereupon determined. The test results are summarized in the following Table VI.

TABLE VI

| Sample No. | Additive | Exposure Time in Hours Required for Embrittlement |
|---|---|---|
| 1 | None | 3,200 |
| 2 | 1,3-Dihydroxyxanthen-9-one | >5,000 |
| 3 | 1-Hydroxy-3-n-dodecyloxyxanthen-9-one | >5,000 |
| 4 | 1-Hydroxy-4-methoxythioxanthen-9-one | >5,000 |

Samples 2–4 correspond to the formulations of Examples 16–18, respectively. Comparison of the test data of samples 2–4 with that of sample 1 reveals that the 1-hydroxyxanthen-9-one and 1-hydroxythioxanthen-9-one compounds are effective ultraviolet light stabilizers for polyester resins. Again, the "greater than" sign before the exposure time data in the foregoing table indicates that at the time the data were reported, brittleness had not yet developed in the specimens of the corresponding samples.

EXAMPLES 19–21

These examples illustrate specific embodiments of a poly(vinyl chloride) composition of this invention.

The formulations of these embodiments are as follows:

*Example 19 formulation*

Components:                                     Concentration in parts by wt.
  Normally solid poly(vinyl chloride) _____ 100
  Dioctyl phthalate _____ 30
  1-hydroxyxanthen-9-one _____ 1

*Example 20 formulation*

Components:
  Normally solid poly(vinyl chloride) _____ 100
  Dioctyl phthalate _____ 30
  1,3-dihydroxyxanthen-9-one _____ 1

*Example 21 formulation*

Components:
  Normally solid poly(vinyl chloride) _____ 100
  Dioctyl phthalate _____ 30
  1-hydroxy-3-n-dodecyloxyxanthen-9-one _____ 1

*Example 21 formulation*

Components:
  Normally solid poly(vinyl chloride) _____ 100
  Dioctyl phthalate _____ 30
  1-hydroxy-4-methoxythioxanthen-9-one _____ 1

Dioctyl phthalate functions as a plasticizer in each of the foregoing formulations.

The poly(vinyl chloride) compositions of the foregoing formulations are prepared by conventional hot roll compounding. The resulting roll slab in each case can be compression molded into films.

Test samples of the foregoing compositions as well as other poly(vinyl chloride) compositions were prepared from a conventional, commercially available, poly(vinyl chloride) marketed as Geon 101. The other poly(vinyl chloride) compositions were formulated with 100 parts by weight of poly(vinyl chloride), 30 parts by weight of dioctyl phthalate and, where indicated in the following Table VII, with 1 part of additive. All test samples were prepared in accordance with the foregoing procedure and the roll slab in each case was compression molded into a flat film of 3 mils thickness. Test specimens 0.5 inch by 2.5 inches were cut from the films and exposed in a modified Atlas Twin-Arc Weather-Ometer of the type previously referred to herein. Again, observation was made of the test specimens for the development of brittleness. Here, too, a test specimen was determined to be brittle when cracks appeared therein when creasing the exposed side of the film on the outside of the crease. The exposure time for the development of brittleness for each film was thereby determined. The test results are summarized in the following Table VII.

TABLE VII

| Sample No. | Additive | Weather-Ometer Exposure Time in Hours Required for Embrittlement |
|---|---|---|
| 1 | None | 200 |
| 2 | 2-Hydroxy-4-methoxybenzophenone | 800 |
| 3 | 1-Hydroxyxanthen-9-one | 500 |
| 4 | 1,3-Dihydroxyxanthen-9-one | 870 |
| 5 | 1-Hydroxy-3-n-dodecyloxyxanthen-9-one | 1,020 |
| 6 | 1-Hydroxy-4-methoxythioxanthen-9-one | 1,200 |

Samples 3–6, it will be noted, correspond to the formulations of Examples 19–22, respectively.

Comparison of the test results of samples 3–6 with the test result of sample 1 shows that the 1-hydroxyxanthen-9-one and 1-hydroxythioxanthen-9-one compounds are effective ultraviolet light stabilizers for poly(vinyl chloride). Moreover, a comparison of the test results of sample 6 and test sample 2 reveal that the 1-hydroxythioxanthen-9-one compound is a more effective ultraviolet light stabilizer than the corresponding 2-hydroxybenzophenone compound.

Thus, there are provided new organic plastic compositions stabilized relative to ultraviolet light. An advantage of these plastic compositions is that the 1-hydroxyxanthen-9-one and 1-hydroxythioxanthen-9-one compounds incorporated therein are larger in molecular size and lower in vapor pressure as compared to the corresponding benzophenone stabilizers and, therefore, are more permanently retained by the plastic materials into which they are compounded. This makes the plastic compositions of this invention particularly useful in films and fibers.

Other advantages, features and specific embodiments of this invention will be apparent to those in the exercise of ordinary skill in the art after reading the foregoing disclosure. In this connection, while this invention has been described in considerable detail relative to specific embodiments thereof, variations and modifications of these embodiments can be effected within the spirit and scope of the invention as dislosed and claimed.

The embodiments of this invention in which an exclusive property or privilege is claimed are defined as follows:

1. An organic plastic composition consisting essentially of at least one resin normally degraded by ultraviolet light and, at an ultraviolet light protective concentration, a compound of the formula:

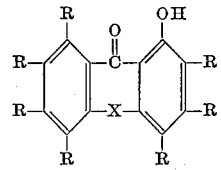

wherein X is selected from the group of oxygen and sulfur radicals and each R is independently selected from the group consisting of hydrogen, hydroxyl, halide, $C_1$–$C_{18}$ alkyl and $C_1$–$C_{18}$ alkoxy radicals.

2. An organic plastic composition consisting essentially of at least one resin normally degraded by ultraviolet light and, at a concentration in a range from about 0.1 to about 10% by weight of said resin, a compound of the formula:

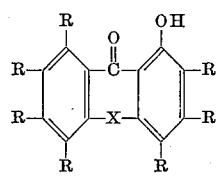

wherein X is selected from the group of oxygen and sulfur radicals and each R is independently selected from the group consisting of hydrogen, hydroxyl, halide, $C_1$–$C_{18}$ alkyl and $C_1$–$C_{18}$ alkoxy radicals.

3. A poly-α-olefin composition consisting essentially of a normally solid polymer of an α-monoolefin having 2–10 carbon atoms and, at an ultraviolet light protective concentration, a compound of the formula:

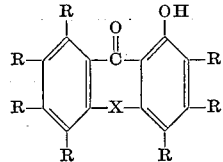

wherein X is selected from the group of oxygen and sulfur radicals and each R is independently selected from the group consisting of hydrogen, hydroxyl, halide, $C_1$–$C_{18}$ alkyl and $C_1$–$C_{18}$ alkoxy radicals.

4. A poly-α-olefin composition consisting essentially of a normally solid polymer of an α-monoolefin having 2–10 carbon atoms and, at a concentration in a range from about 0.1 to about 10% by weight of said polymer, a compound of the formula:

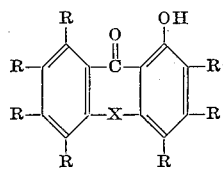

wherein X is selected from the group of oxygen and sulfur radicals and each R is independently selected from the group consisting of hydrogen, hydroxyl, halide, $C_1$–$C_{18}$ alkyl and $C_1$–$C_{18}$ alkoxy radicals.

5. A polyethylene composition consisting essentially of normally solid polyethylene and 1-hydroxyxanthen-9-one at a concentration in a range from about 0.1 to about 10% by weight of said normally solid polyethylene.

6. A polyethylene composition consisting essentially of normally solid polyethylene and 1-hydroxy-3-n-dodecyloxyxanthen-9-one at a concentration in the range from about 0.1 to about 10% by weight of said normally solid polyethylene.

7. A polypropylene composition consisting essentially of a normally solid polypropylene and, at an ultraviolet light stabilizing concentration, a compound of the formula:

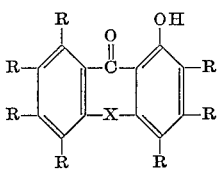

wherein X is selected from the group of oxygen and sulfur radicals and each R is independently selected from the group consisting of hydrogen, hydroxyl, halide, $C_1$–$C_{18}$ alkyl and $C_1$–$C_{18}$ alkoxy radicals.

8. A polypropylene composition consisting essentially of a normally solid polypropylene and 1-hydroxyxanthen-9-one at a concentration in a range from about 0.1 to about 10% by weight of said normally solid polypropylene.

9. A polypropylene composition consisting essentially of a normally solid polypropylene and 1,3-dihydroxyxanthen-9-one at a concentration in a range from about 0.1 to about 10% by weight of said normally solid polypropylene.

10. A polypropylene composition consisting essentially of a normally solid polypropylene and 3-dodecyloxy-1-hydroxyxanthen-9-one at a concentration in a range from about 0.1 to about 10% by weight of said normally solid polypropylene.

11. A polypropylene composition consisting essentially of a normally solid polypropylene and 1-hydroxy-4-methoxythioxanthen-9-one at a concentration in a range from about 0.1 to about 10% by weight of said normally solid polypropylene.

12. A cellulose ester plastic composition consisting essentially of (1) a cellulose ester of an organic acid having 2–4 carbon atoms and (2) at an ultraviolet light protective concentration a compound of the formula:

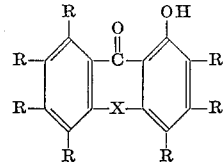

wherein X is selected from the group of oxygen and sulfur radicals and each R is independently selected from the group consisting of hydrogen, hydroxyl, halide, $C_1$–$C_{18}$ alkyl and $C_1$–$C_{18}$ alkoxy radicals.

13. A cellulose ester plastic composition consisting essentially of (1) a cellulose ester of an organic acid having 2–4 carbon atoms and (2) at a concentration in a range from about 0.1 to about 10% by weight of said cellulose ester, a compound of the formula:

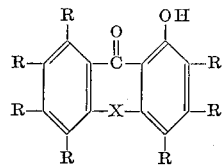

wherein X is selected from the group of oxygen and sulfur radicals and each R is independently selected from the group consisting of hydrogen, hydroxyl, halide, $C_1$–$C_{18}$ alkyl and $C_1$–$C_{18}$ alkoxy radicals.

14. A cellulose ester plastic composition consisting essentially of cellulose acetate-butyrate and 1,3-dihydroxyxanthen-9-one at a concentration in a range from about 0.1 to about 10% by weight of said cellulose acetate-butyrate.

15. A cellulose ester plastic composition consisting essentially of cellulose acetate-butyrate and 1-hydroxy-3-n-dodecyloxyxanthen-9-one at a concentration in a range from about 0.1 to about 10% by weight of said cellulose acetate-butyrate.

16. A cellulose ester plastic composition consisting essentially of cellulose acetate-butyrate and 1-hydroxy-3-dodecyloxyxanthen-9-one at a concentration in a range from about 0.1 to about 10% by weight of said cellulose acetate-butyrate.

17. A cellulose ester plastic composition consisting essentially of cellulose acetate-butyrate and 1,3-dihydroxyxanthen-9-one at a concentration in a range from about 0.1 to about 10% by weight of said cellulose acetate-butyrate.

18. A cellulose ester plastic composition consisting essentially of cellulose acetate-butyrate and 1-hydroxy-4-methoxythioxanthen-9-one at a concentration in a range from about 0.1 to about 10% by weight of said cellulose acetate-butyrate.

19. A polyester composition consisting essentially of a normally solid polyester resin and, at an ultraviolet light protective concentration, a compound of the formula:

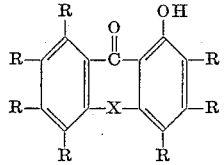

wherein X is selected from the group of oxygen and sulfur radicals and each R is independently selected from the group consisting of hydrogen, hydroxyl, halide, $C_1$–$C_{18}$ alkyl and $C_1$–$C_{18}$ alkoxy radicals.

20. A polyester plastic composition consisting essentially of a normally solid polyester resin and, at a concentration in a range from about 0.1 to about 10% by weight of said resin, a compound of the formula:

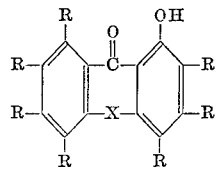

wherein X is selected from the group of oxygen and sulfur radicals and each R is independently selected from the group consisting of hydrogen, hydroxyl, halide, $C_1$–$C_{18}$ alkyl and $C_1$–$C_{18}$ alkoxy radicals.

21. A polyester composition consisting essentially of a normally solid polyester of terephthalic acid and 1,4-cyclohexanedimethanol at a 1:1 mole ratio and 1-hydroxy-3-n-dodecyloxyxanthen-9-one at a concentration in a range from about 0.1 to about 10% by weight of said polyester.

22. A polyester composition consisting essentially of a normally solid polyester of terephthalic acid and 1,4-cyclohexanedimethanol at a 1:1 mole ratio and 1,3-dihydroxyxanthen-9-one at a concentration in a range from about 0.1 to about 10% by weight of said polyester.

23. A polyester composition consisting essentially of a normally solid polyester of terephthalic acid and 1,4-cyclohexanedimethanol at a 1:1 mole ratio and 1-hydroxy-4-methoxythioxanthen-9-one at a concentration in a range from about 0.1 to about 10% by weight of said polyester.

24. A polyester composition consisting essentially of a normally solid polyester of terephthalic acid and 1,4-cyclohexanedimethanol at a 1:1 mole ratio and 1-hydroxyxanthen-9-one at a concentration in a range from about 0.1 to about 10% by weight of said polyester.

25. A polyester composition consisting essentially of a normally solid polyester of terephthalic acid, isophthalic acid and 1,4-cyclohexanedimethanol at a 0.83:0.17:1 mole ratio and 1,3-dihydroxyxanthen-9-one at a concentration in a range from about 0.1 to about 10% by weight of said polyester.

26. A polyester composition consisting essentially of a normally solid polyester of terephthalic acid, isophthalic acid and 1,4-cyclohexanedimethanol at a mole ratio of 0.83:0.17:1, and 1-hydroxy-3-n-dodecyloxyxanthen-9-one at a concentration in a range from about 0.1 to about 10% by weight of said polyester.

27. A polyester composition consisting essentially of a normally solid polyester of terephthalic acid, isophthalic acid and 1,4-cyclohexanedimethanol at a mole ratio of 0.83:0.17:1, and 1-hydroxy-4-methoxythioxanthen-9-one at a concentration in a range from about 0.1 to about 10% by weight of said polyester.

28. A poly(vinyl chloride) composition consisting essentially of a normally solid poly(vinyl chloride) resin and, at an ultraviolet light protective concentration, a compound of the formula:

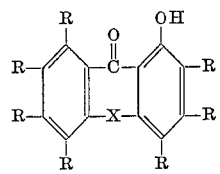

wherein X is selected from the group of oxygen and sulfur radicals and each R is independently selected from the group consisting of hydrogen, hydroxyl, halide, $C_1$–$C_{18}$ alkyl and $C_1$–$C_{18}$ alkoxy radicals.

29. A poly(vinyl chloride) composition consisting essentially of a normally solid poly(vinyl chloride) resin and, at a concentration in a range from about 0.1 to about 10% by weight of said resin, a compound of the formula:

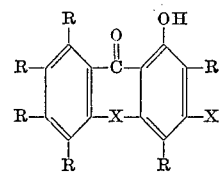

wherein X is selected from the group of oxygen and sulfur radicals and each R is independently selected from the group consisting of hydrogen, hydroxyl, halide, $C_1$–$C_{18}$ alkyl and $C_1$–$C_{18}$ alkoxy radicals.

30. A poly(vinyl chloride) composition consisting essentially of a normally solid poly(vinyl chloride) resin and 1-hydroxyxanthen-9-one at a concentration in a range from about 0.1 to about 10% by weight of said resin.

31. A poly(vinyl chloride) composition consisting essentially of a normally solid poly(vinyl chloride) resin and 1-hydroxy-3-n-dodecyloxyxanthen-9-one at a concentration in a range from about 0.1 to about 10% by weight of said resin.

32. A poly(vinyl chloride) composition consisting essentially of a normally solid poly(vinyl chloride) resin and 1,3-dihydroxyxanthen-9-one at a concentration in a range from about 0.1 to about 10% by weight of said resin.

33. A poly(vinyl chloride) composition consisting essentially of a normally solid poly(vinyl chloride) resin and 1-hydroxy-4-methoxythioxanthen-9-one at a concentration in a range from about 0.1 to about 10% by weight of said resin.

34. A process for stabilizing an organic plastic material relative to ultraviolet light, said plastic material comprising at least one resin normally degraded by ultraviolet light, which comprises: incorporating into said plastic material an ultraviolet light stabilizing quantity of a compound of the formula:

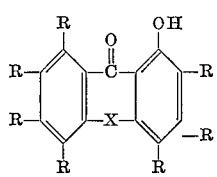

wherein X is selected from the group of oxygen and sulfur radicals and each R is independently selected from the group consisting of hydrogen, hydroxyl, halide, $C_1$–$C_{18}$ alkyl and $C_1$–$C_{18}$ alkoxy radicals.

35. Shaped articles of a plastic composition consisting essentially of a normally solid plastic material comprising at least one resin normally degraded by ultraviolet light and, at an ultraviolet light protective concentration, a compound of the formula:

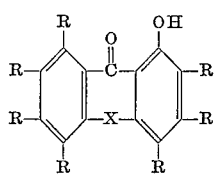

wherein X is selected from the group of oxygen and sulfur radicals and each R is independently selected from the group consisting of hydrogen, hydroxyl, halide, $C_1$–$C_{18}$ alkyl and $C_1$–$C_{18}$ alkoxy radicals.

36. An ultraviolet light-absorbing composition of matter consisting essentially of an organic polymer plastic material which is subject to ultraviolet light degradation having uniformly dispersed therein a small amount sufficient to stabilize said organic polymer plastic material against ultraviolet light degradation of a compound of the formula:

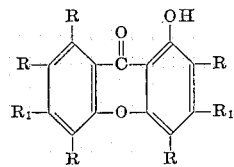

wherein each R is selected from the group consisting of hydrogen and an alkyl radical containing 1 to 18 carbon atoms, and each $R_1$ is selected from the group consisting of hydrogen, hydroxyl, an alkyl radical containing 1 to 18 carbon atoms and an alkoxy radical containing 1 to 18 carbon atoms.

References Cited

UNITED STATES PATENTS 2,951,052  8/1960  Darby _____ 260—45.7
2,976,259  3/1961  Hardy et al. _____ 106—187

FOREIGN PATENTS 564,593  10/1958  Canada.

MORRIS LIEBMAN, *Primary Examiner.*

ALEXANDER H. BRODMERKEL, *Examiner.*

A. LIEBERMAN, *Assistant Examiner.*